US005430439A

United States Patent [19]

Bodet et al.

[11] Patent Number: 5,430,439

[45] Date of Patent: Jul. 4, 1995

[54] SELECTIVE CALL RECEIVER HAVING USER DEFINED MESSAGE INFORMATION IN MEMORY AND PRESENTATION METHODS THEREOF

[75] Inventors: Paul W. Bodet; John J. Johnson, both of Boynton Beach; Hector Suarez, Miramar, all of Fla.

[73] Assignee: Motorola, Inc., Schaumburg, Ill.

[21] Appl. No.: 34,197

[22] Filed: Mar. 19, 1993

Related U.S. Application Data

[63] Continuation of Ser. No. 663,507, Mar. 4, 1991, abandoned.

[51] Int. Cl.[6] .......... H04Q 1/00; G08B 5/22

[52] U.S. Cl. .......... 340/825.44; 364/705.05; 340/311.1

[58] Field of Search .......... 340/825.44, 311.1; 364/705.01, 705.05, 705.06, 705.07, 705.08; 235/375, 380; 455/200.1

[56] References Cited

U.S. PATENT DOCUMENTS

| | | | |
|---|---|---|---|
| 4,117,542 | 9/1978 | Klausner et al. | 364/705.05 |
| 4,330,780 | 5/1982 | Masaki | 340/825.44 |
| 4,336,524 | 6/1982 | Levine | 340/311.1 |
| 4,382,256 | 5/1983 | Nagata | 340/825.44 |
| 4,402,056 | 8/1983 | Sado et al. | 364/705.06 |
| 4,536,739 | 8/1985 | Nobuta | 340/323 R |
| 4,713,808 | 12/1987 | Gaskill et al. | 370/94 |
| 4,766,294 | 8/1988 | Nara et al. | 235/380 |
| 4,962,377 | 10/1990 | Wallace et al. | 340/825.44 |
| 4,962,545 | 10/1990 | Klaczak et al. | 455/200 |
| 4,994,797 | 2/1991 | Breeden | 340/825.44 |
| 5,043,721 | 8/1991 | May | 340/825.44 |
| 5,057,676 | 10/1991 | Komaki | 235/375 |
| 5,241,305 | 8/1993 | Fascenda | 340/825.44 |
| 5,257,307 | 10/1993 | Ise | 340/825.44 |

FOREIGN PATENT DOCUMENTS

| | | | |
|---|---|---|---|
| 9111889 | 8/1991 | WIPO | 340/825.44 |

*Primary Examiner*—Donald J. Yusko
*Assistant Examiner*—Edward Merz
*Attorney, Agent, or Firm*—Kelly A. Gardner; John H. Moore

[57] ABSTRACT

A user of a selective call receiver (100) is capable of inputting and storing user defined search key information and user defined corresponding information into non-volatile memory (107), via user input control (109). Subsequent to receiving and decoding a message having message information and storing the message information into memory (106), the selective call receiver (100) is capable of searching the message information for an occurrence of the user defined search key information, and presenting the message information and at least a portion of corresponding information for an occurrence of corresponding user defined search key information in the message information.

14 Claims, 3 Drawing Sheets

SELECTIVE CALL RECEIVER HAVING USER DEFINED MESSAGE INFORMATION IN MEMORY AND PRESENTATION METHODS THEREOF

This is a continuation of application Ser. No. 07/663,507, filed Mar. 4, 1991, now abandoned.

FIELD OF THE INVENTION

This invention relates generally to selective call receivers capable of receiving and presenting messages, and including but not limited to those selective call receivers capable of storing and subsequently presenting received messages including user defined message information.

BACKGROUND OF THE INVENTION

A conventional selective call receiver commonly receives a display message page comprising address information (i.e., for selecting the particular receiver) coupled with display message information. The display message information is typically presented to a user of the receiver via a display. One common form of display message information includes numeric characters, such as the numbers 1 thru 9, and 0. To enhance message readability, optional characters, such as a "blank space" character or a dash character (i.e., "-"), are embedded in the display message information. These characters are typically entered into a paging system by a caller, preferably using a dual tone multi-frequency (DTMF) telephone set. For example, an occurrence of an optional character within the display message information may coincide with a caller pushing the asterisk button (i.e.,"*") on the telephone set and a paging terminal sending the corresponding optional character. In this way, a user of the conventional selective call receiver is capable of receiving a numeric display message page.

A newer form of display message information includes alphanumeric characters. The alphanumeric characters (i.e., typically including most of the characters found on a conventional typewriter keyboard) allow significantly more information to be conveyed between the caller and the user of the selective call receiver. Because telephone sets normally constrain the display message information to numeric characters, the caller usually calls an answering service that enters the alphanumeric display message page into the paging system via a console directly connected to a paging terminal. However, this method of conveying the display message information lacks confidentiality. Further, the answering service can erroneously send their own interpretation of the message information, and not necessarily what was intended by the caller.

An alternative way to send the alphanumeric message is for the caller to enter the alphanumeric display message directly into the paging system. This normally requires the caller to be equipped with an alphanumeric page entry terminal. This entry device (e.g., the Motorola Page Entry Terminal) is capable of modem communication with a remotely located paging terminal via the public switched telephone network (PSTN). In this way, the caller can convey a full alphanumeric display message to the user of the selective call receiver. However, the caller may not always have access to a page entry terminal for sending the alphanumeric display message.

Regrettably, even when a caller has access to a page entry terminal, conventional paging system resources (e.g., available paging terminal memory, and paging channel throughput capacity) can significantly limit the message length allowed for the alphanumeric display message information. For example, in some paging systems a maximum of 40 alphanumeric characters are permitted in a display message page. This limitation can severely restrict the presentation of sufficient message information to effectively convey the message to the user.

Moreover, a conventional paging system normally may not have access to specific message information within a display message page, other than such attributes as the number of characters in a message or the type of characters allowed. The right to interpret the content of the display message information is usually reserved for the caller and for the user of the selective call receiver. For example, a caller may enter from a telephone set the display message information "555-1234 911" intended for a user of an alphanumeric display pager. The user then interprets the received numeric display message as "CALL JOHN SMITH AT HOME AT 212-555-1234 IMMEDIATELY!!". Hence, the conventional paging system normally is not capable of interpreting the display message entered by the caller and sending the alphanumeric display message to the user in its intended final form (i.e., defined for the particular user).

Furthermore, it is undesirable to maintain a centrally located paging terminal data base of user defined message information mapped to selective call display receivers in the paging system. First, due to security and privacy concerns, user defined message information (i.e., the interpretation of display message information) may best be stored at the individual selective call display receiver. Second, changing an interpretation of display message information (i.e., redefining the interpretation and presentation of display message information) would normally be easier and more convenient to perform locally at the selective call receiver rather than remotely at the paging terminal data base.

Thus, for all the reasons discussed above, it is regrettable that no conventional paging system or selective call receiver allows a user of the selective call receiver to define the interpretation and the presentation of message information by the selective call receiver.

SUMMARY OF THE INVENTION

A selective call receiver comprises a receiver for receiving a signal including a message having address information and message information, a decoder coupled to the receiver for decoding the message having address information and message information, and a message memory coupled to the decoder for storing the message information. The selective call receiver further includes means for inputting user defined search key information and user defined corresponding information by a user of the selective call receiver and a database memory coupled to the inputting means for storing the user defined search key information and the user defined corresponding information constituting at least one entry in a database, each user defined search key information being associated to user defined corresponding information as a database entry. Searching means, coupled to the message memory and the database memory, searches through the message information in the message memory and compares the user defined search key information from each entry in the database to the message information to detect a match for each occurrence of the user defined search key information within the message information, regardless of positioning of user defined search key information within the message information, and presenting means presents modified message information to a user. The modified message information comprises the message information having each detected occurrence of user defined search key information replaced with the corresponding information from each matching entry in the database, when user defined search key information has been replaced by the corresponding information, and for presenting the message information, without modification, when no user defined search key information has been replaced by the corresponding information.

A method for searching and presenting modified message information also functions within the selective call receiver.

DESCRIPTION OF A PREFERRED EMBODIMENT

Figure 1:
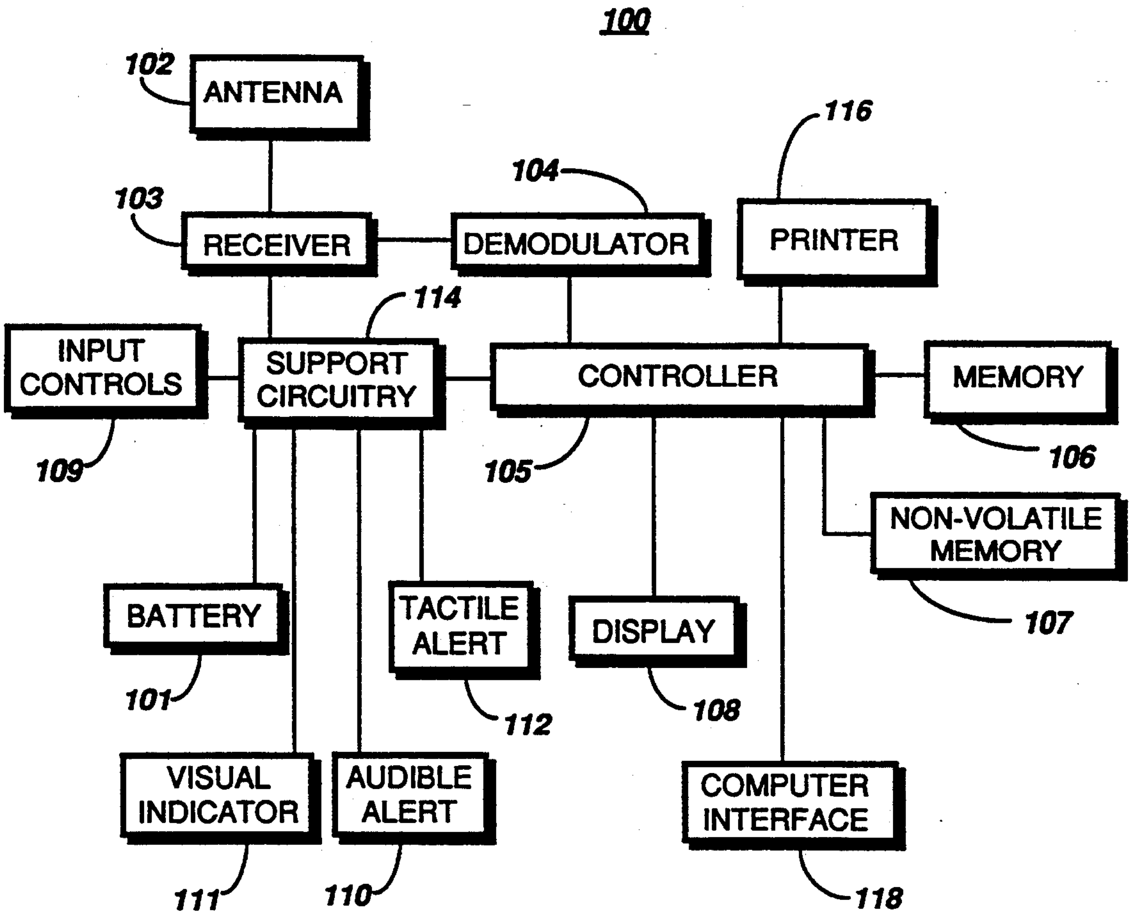
FIG. 1 is a block diagram of a selective call receiver in accordance with an embodiment of the present invention.

Referring to FIG. 1, a block diagram of a selective call receiver 100 is shown, in accordance with an embodiment of the present invention. The selective call receiver 100 is battery 101 powered and operates to receive a radio frequency (RF) signal via an antenna 102. A receiver 103 couples the received signal to a demodulator 104, which recovers any information signal present using conventional techniques. The recovered information signal is coupled to a controller 105 that interprets and decodes the recovered information.

In the preferred embodiment, the controller 105 comprises a microprocessor having a signal processor (decoder) implemented in both hardware and software. The signal processor checks the recovered information signal for address information and correlates a recovered address with a predetermined address stored in the selective call receiver's non-volatile memory 107. Hence, the selective call receiver 100 correlates the recovered address and the predetermined address associated with the selective call receiver 100 to determine selection, preferably following a conventional signalling protocol such as Post Office Code Standardisation Advisory Group (POCSAG) or Golay Sequential Coding (GSC). When the addresses correlate, and in accordance with settings associated with user input control 109 (e.g., a keypad, buttons, or switches), the controller 105 normally stores a recovered message information in memory 106. In this way, the selective call receiver 100 is capable of receiving a message and storing the message information in memory 106.

Subsequently, the selective call receiver 100 typically presents at least a portion of the received message information to a user, such as by a display 108 (e.g., a liquid crystal display) or a printer 116 (e.g., a thermal printer). Usually, an audible alert indicator 110, a visual alert indicator 111 (e.g., a lamp, a light emitting diode, or an icon representation on the display 108), a tactile alert indicator 112, or a combination of the aforementioned indicators signals to the user that a message has been received. The user may then view at least a portion of the message information presented on the display 108 by activating the user input control 109. Alternatively, the message information is presented on hardcopy using the printer 116, preferably using a thermal printer.

The non-volatile memory 107 typically includes a plurality of registers for storing configuration words that characterize the operation of the selective call receiver 100, including the predetermined address information for the signal processor. Preferably, a collection of user defined search key information coupled to user defined corresponding information is organized in the non-volatile memory 107 to allow the inventive selective call receiver 100 to interpret and present the received message information in a user defined form, as will be more fully discussed below.

The user defined search key information is coupled with the user defined corresponding information in non-volatile memory 107, organized as a data base. For example, search key information "555-1234" may be coupled with corresponding information "CALL JOHN SMITH AT HOME AT 212-555-1234" as a first data base entry. A second exemplary data base entry could be the search key information "911" coupled with corresponding information "IMMEDIATELY!!". Naturally, additional entries in the data base would progressively define the data base and increase the potential opportunities for interpretation of a received message information.

Upon receiving a message having message information such as "555-1234 911", the selective call receiver 100 searches the message information using the exemplary data base. An occurrence of the user defined search key information (e.g., matching either "555-1234" or "911") is interpreted by the selective call receiver 100 to represent the respective corresponding information. Therefore, in the example above, the received message information "555-1234 911" is interpreted by the selective call receiver 100 and presented to the user as "CALL JOHN SMITH AT HOME AT 212-555-1234 IMMEDIATELY!!". Accordingly, for the example, the caller is capable of entering the former numeric message information, optionally via a telephone set, and the latter alphanumeric message information is presented to the user to more fully convey the intended message.

Another important advantage of the inventive selective call receiver 100 is that the paging system remains unencumbered from maintaining a central data base of user defined message information and from interpreting the message information for the users. The interpretation of message information is reserved for the caller and for the user of the inventive selective call receiver 100, thereby providing additional security to the communication. Moreover, the user defined data base is conveniently inputted and maintained by the user locally at the selective call receiver 100, as will be more fully discussed below.

The user defined search key information and the user defined corresponding information are preferably inputted into the non-volatile memory 107 via the user input control 109, in a known way. For example, the user may input data base entries in the selective call receiver 100 by responding to prompts on the display 108 with typing on the keypad (i.e., via the user input control 109).

In a second means for inputting data base information, a computer interface 118, preferably following conventional RS-232 or RS-422 serial communication protocol, couples instructions from a personal computer (PC) (not shown) to the controller 105 to input the user defined data base information. A user of the selective call receiver 100 therefore is capable of conveniently downloading information into the selective call receiver 100 from a computer. In this case, a user interface for the selective call receiver 100 may be significantly simplified, since a more elaborate user input control is provided by the personal computer (e.g., a keyboard connected to the PC). Thus, the user defined search key information and the user defined corresponding information may be entered via the computer interface 118 using computer communication.

Lastly, a support circuit 114 preferably comprises a conventional signal multiplexing integrated circuit, a voltage regulator and control mechanism, a current regulator and control mechanism, environmental sensing circuitry such as for light or temperature conditions, audio power amplifier circuitry, control interface circuitry, and display illumination circuitry. These elements are arranged to provide support for the functions of the selective call receiver 100 as may be requested by a user.

A selective call receiver 100 that is responsive to multiple addresses provides additional advantages to the user, according to the present invention. Similar to the single address selective call receiver 100 discussed earlier, each predetermined address is stored in non-volatile memory 107. Likewise, an independent user defined data base may be stored in non-volatile memory 107 for each predetermined address. Hence, a selective call receiver 100 that is responsive to multiple addresses is also capable of interpreting recovered message information using the respective user defined data base. For example, a user of a selective call receiver 100 having two addresses for receiving alphanumeric display messages may provide a first address to business associates and a second address to personal acquaintances. Two independent user defined data bases may be entered in non-volatile memory 107, the first for interpreting message information received from business associates and the second for interpreting message information received from personal acquaintances. Therefore, the user of the selective call receiver 100 may customize the interpretation and presentation of received message information for the type of caller sending the message, as represented by the received address information.

Once the user defined data base information is stored in non-volatile memory 107, the controller 105 may operate to present the received message information, including presenting the user defined corresponding information for an occurrence of the user defined search key information in the message information. Accordingly, a number of methods for interpreting and presenting the message information in a user defined form are discussed below.

A first method of interpreting received message information may be accomplished by the user of the inventive selective call receiver 100, as follows. Initially, a message information may be read by the user from, say, a display. The user then enters a manual information retrieval mode where a search key criteria is entered via the user input control (e.g., via the keypad), the selective call receiver 100 searches the data base for a match in a user defined search key information, and upon locating a match displays the user defined corresponding information from the data base. In this way, the user is capable of simply searching the data base for any occurrence of a user defined search key information and displaying the user defined corresponding information to interpret a received message information.

Figure 2:
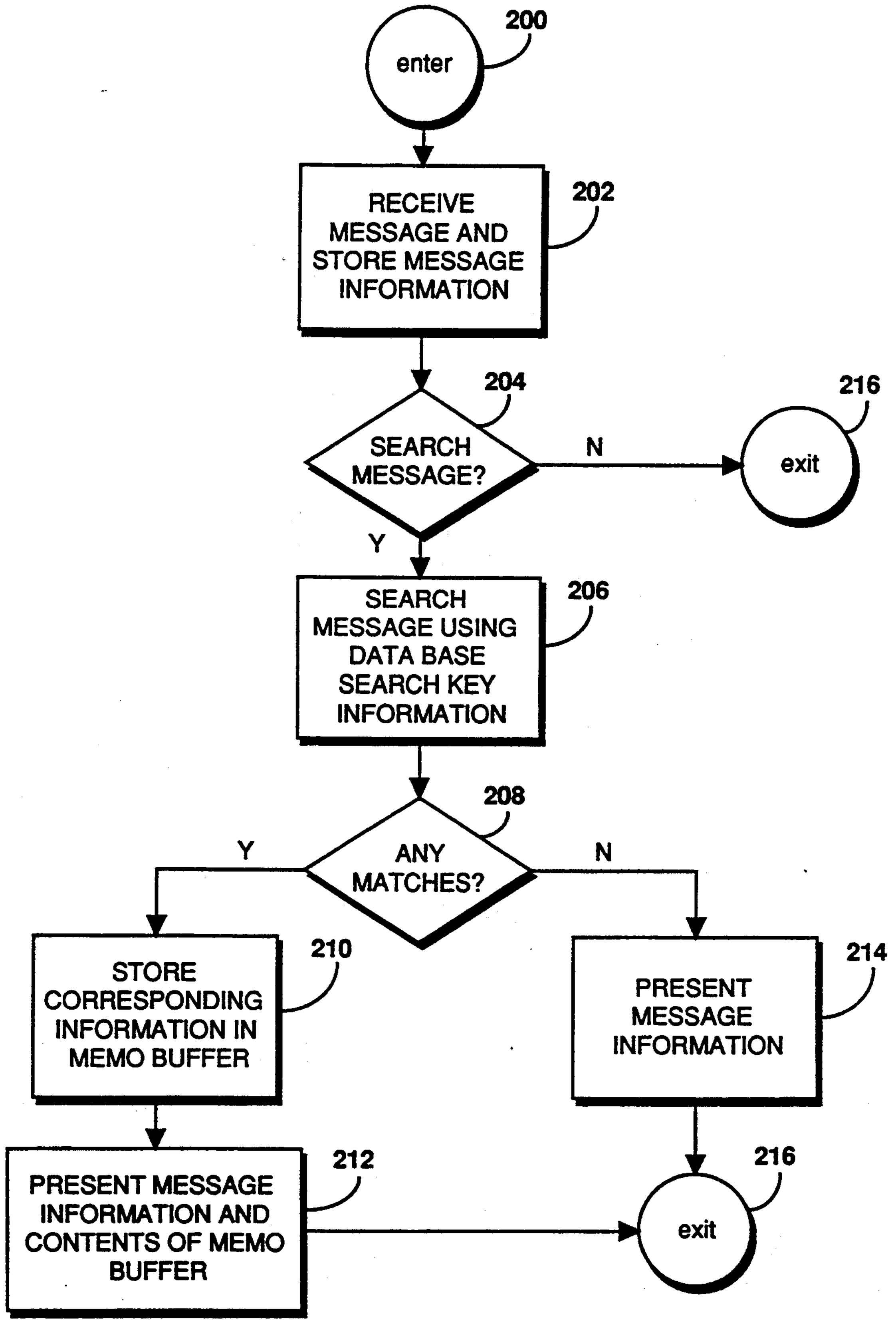
FIG. 2 is a first flow diagram for the selective call receiver of FIG. 1, according to the present invention.

Referring to FIG. 2, a first flow diagram for the selective call receiver of FIG. 1 is shown, according to the present invention. In this case, a user of the selective call receiver 100 is capable of relatively automatically searching a received message information. For example, a message is received and the message information is stored (200 and 202), as discussed earlier. Upon detection of a user input control requesting a search of the particular message information 204, the selective call receiver 100 searches the message information using the,data base to identify a match between a text string found within the message information and a user defined search key information 206. A successful match stores the user defined corresponding information in a temporary "memo" buffer and presents the message information and the contents of the "memo" buffer (208, 210, 212, and 216), such as by a display 108. In this example, any unsuccessful attempt simply displays the message information with no indication of a match (208, 214, 216). Hence, a user of the selective call receiver 100 is capable of conveniently searching a received message information and having an occurrence of a user defined search key information in the message information cause a display of the user defined corresponding information.

Figure 3:
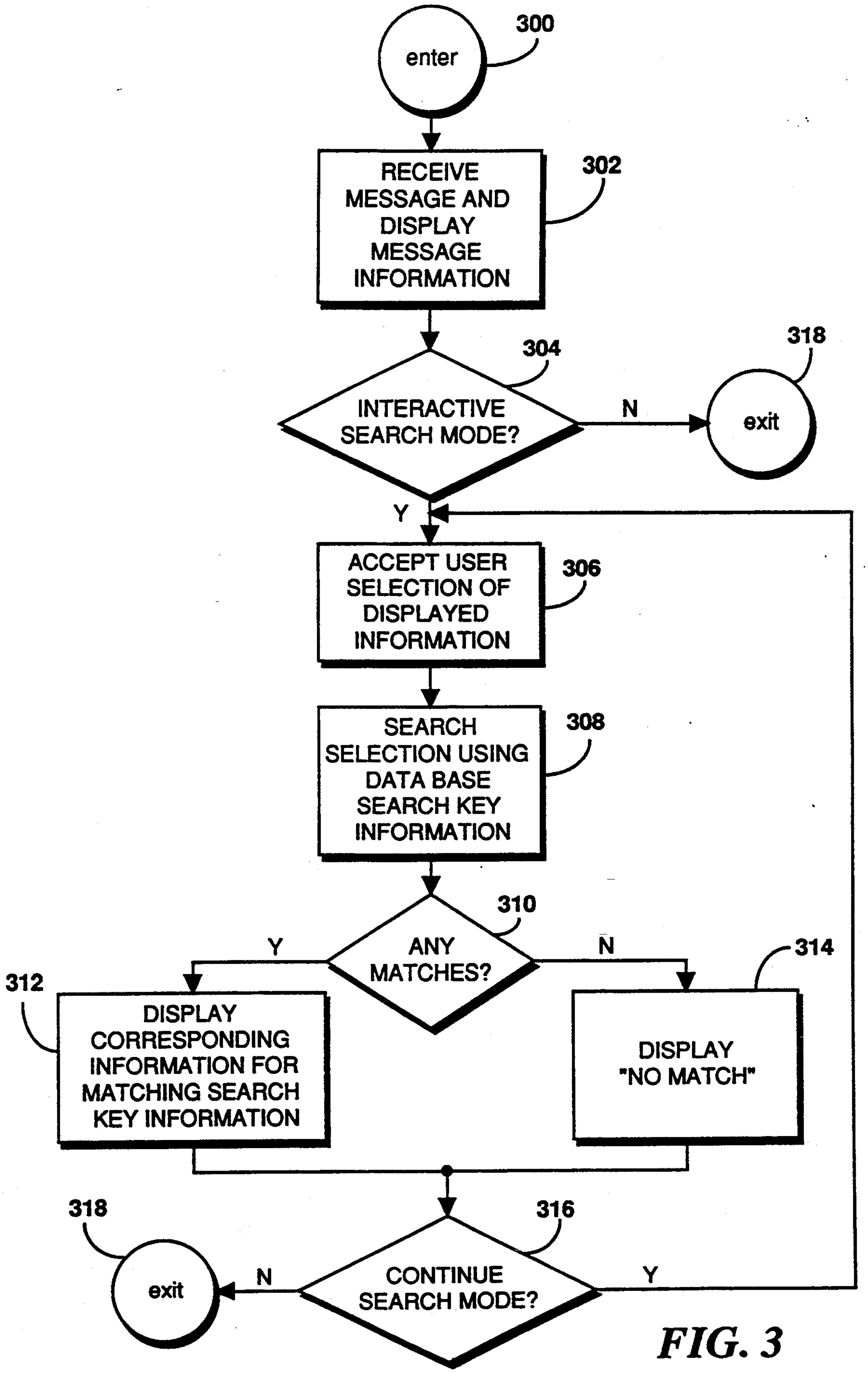
FIG. 3 is a second flow diagram for the selective call receiver of FIG. 1, according to the present invention.

Referring to FIG. 3, a second flow diagram for the selective call receiver of FIG. 1 is shown, according to the present invention. In this alternative, a user of the selective call receiver 100 is capable of interactively searching a received message information by first selecting at least a portion of the information displayed (e.g., the received message information being displayed on the liquid crystal display), and subsequently having the selective call receiver 100 search the selected at least a portion of information displayed for any matches with the data base user defined search key information (300, 302, 304, 306, 308, 310). Selection of at least a portion of the information displayed is preferably accomplished by prompting the user to select at least a portion of the information displayed, and allowing the user to input the information to be searched via the user input control 109 while viewing the message information on the display. A successful match on the selected at least a portion of the information displayed with a user defined search key information in the data base will display the user defined corresponding information, in accordance with the invention (310 and 312). An unsuccessful search displays the message "NO MATCH" (310 and 314). In the interactive mode, the user is prompted to continue searching a new selection of the displayed information (316, 306, etc. . . ).

Therefore, the inventive selective call receiver is capable of receiving message information, searching the message information for an occurrence of a user defined search key information, and presenting the message information and at least a portion of corresponding information, customized for the user.

What is claimed is:

1. A selective call receiver comprising:

a receiver for receiving a signal including a message having address information and message information;

a decoder coupled to the receiver for decoding the message having address information and message information;

a message memory coupled to the decoder for storing the message information;

means for inputting user defined search key information and user defined corresponding information by a user of the selective call receiver;

a database memory coupled to the inputting means for storing the user defined search key information and the user defined corresponding information constituting at least one entry in a database, each user defined search key information being associated to user defined corresponding information as a database entry;

means, coupled to the message memory and the database memory, for searching through the message information in the message memory and comparing the user defined search key information from each entry in the database to the message information to detect a match for each occurrence of the user defined search key information within the message information, regardless of positioning of user defined search key information within the message information; and means for presenting modified message information to a user, the modified message information comprising the message information having each detected occurrence of user defined search key information replaced with the corresponding information from each matching entry in the database, when user defined search key information has been replaced by the corresponding information, and for presenting the message information, without modification, when no user defined search key information has been replaced by the corresponding information.

2. The selective call receiver of claim 1, wherein the inputting means includes a keypad.

3. The selective call receiver of claim 1, wherein the inputting means includes computer interface means for inputting the user defined search key information and the user defined corresponding information via computer communication.

4. The selective call receiver of claim 1, wherein the presenting means comprises means for printing the modified message information.

5. The selective call receiver of claim 1, wherein the presenting means comprises means for displaying the modified message information to a user.

6. The selective call receiver of claim 5, further comprising:

a modified message memory for storing the modified message information;

means, coupled to the modified message memory, for selecting at least a portion of the modified message information by a user;

means coupled to the modified message memory for searching through the selected at least a portion of the modified message information in the modified message memory and comparing the user defined search key information from each entry in the database to the selected at least a portion of modified message information to detect a match for each occurrence of the user defined search key information within the selected at least a portion of modified message information; and means for displaying the selected at least a portion of the modified message information having each detected occurrence of user defined search key information replaced with the corresponding information from each matching entry in the database.

7. A method in a selective call receiver comprising the steps of:

receiving an RF signal including a message having address information and message information;

decoding the message having address information and message information;

storing the message information;

inputting user defined search key information and user defined corresponding information by a user of the selective call receiver;

storing the user defined search key information and the user defined corresponding information constituting at least one entry in a database, each user defined search key information being associated to user defined corresponding information as a database entry;

searching through the message information and comparing the user defined search key information from each entry in the database to the message information to detect a match for each occurrence of the user defined search key information within the message information, regardless of positioning of user defined search key information within the message information;

presenting modified message information to a user, the modified message information comprising the message information having each detected occurrence of user defined search key information replaced with the corresponding information from each matching entry in the database, when user defined search key information has been replaced with the corresponding information; and presenting the message information, without modification, when no user defined search key information has been replaced with the corresponding information.

8. The method of claim 7 wherein the inputting step includes the step of inputting the user defined search key information and the user defined corresponding information via a keypad.

9. The method of claim 7 wherein the inputting step includes the step of inputting the user defined search key information and the user defined corresponding information via computer interface means using computer communication.

10. The method of claim 7, wherein the presenting step includes the step of printing the modified message information.

11. The method of claim 7, wherein the presenting step includes the step of displaying the modified message information to a user.

12. The method of claim 11, wherein the displaying step includes the steps of:

accepting a user input control from a user of the selective call receiver; and displaying the modified message information in response to the accepted user input control.

13. The method of claim 11, further comprising the steps of:

selecting at least a portion of the modified message information by a user;

searching through the selected at least a portion of the modified message information and comparing the user defined search key information from each entry in the database to the selected at least a portion of modified message information to detect a match for each occurrence of the user defined search key information within the selected at least a portion of modified message information; and displaying the selected at least a portion of the modified message information having each detected occurrence of user defined search key information replaced with the corresponding information from each matching entry in the database.

14. A selective call receiver comprising:

a receiver for receiving a signal including a message having address information and message information;

address memory for storing a plurality of predetermined addresses corresponding to the selective call receiver;

an address correlator coupled to the receiver and the address memory for correlating the address information of the message to the plurality of predetermined addresses to determine a match between the address information and one of the plurality of predetermined addresses;

a message decoder coupled to the receiver and the address correlator for decoding the message information in response to the address correlator determining that the address information matches one of the plurality of predetermined addresses;

a message memory coupled to the message decoder for storing the message information;

means for inputting user defined search key information and user defined corresponding information by a user of the selective call receiver;

a database memory for storing a plurality of databases, each database of the plurality of databases being associated with one of the plurality of predetermined addresses, the database memory being coupled to the inputting means for storing the user defined search key information and the user defined corresponding information constituting at least one entry in each database of the plurality of databases, each user defined search key information being associated to user defined corresponding information as a database entry;

means, coupled to the address correlator, the message memory, and the database memory, for selecting one database of the plurality of databases that is associated with the predetermined address that matched the address information of the message, and for searching through the message information in the message memory and comparing the user defined search key information from each entry in the selected one database to the message information to detect a match for each occurrence of the user defined search key information within the message information, regardless of positioning of user defined search key information within the message information; and means for presenting modified message information to a user, the modified message information comprising the message information having each detected occurrence of user defined search key information replaced with the corresponding information from each matching entry in the selected one database, when user defined search key information has been replaced with the corresponding information, and for presenting the message information, without modification, when no user defined search key information has been replaced with the corresponding information.

* * * * *